United States Patent [19]
Matthews et al.

[11] Patent Number: 5,860,124
[45] Date of Patent: Jan. 12, 1999

[54] METHOD FOR PERFORMING A CONTINUOUS OVER-WRITE OF A FILE IN NONVOLATILE MEMORY

[75] Inventors: Walter S. Matthews; Clark S. Thurlo, both of Folsom; MacDonald Verner, III, El Dorado Hills; Deborah L. See, Placerville; Phillip J. del Pozo, III, Folsom, all of Calif.

[73] Assignee: Intel Corporation, Santa Clara, Calif.

[21] Appl. No.: 722,979

[22] Filed: Sep. 30, 1996

[51] Int. Cl.⁶ ..................................................... G06F 12/12
[52] U.S. Cl. ............................................. 711/165; 711/159
[58] Field of Search ............................... 711/6, 103, 113, 711/165, 133, 159, 156; 365/185.33

[56] References Cited

U.S. PATENT DOCUMENTS

5,475,693  12/1995  Christopherson et al. ............ 371/10.2
5,535,369   7/1996  Wells et al. ............................... 711/171
5,581,723  12/1996  Hasbun et al. ........................... 711/103
5,590,300  12/1996  Lautzenheiser ......................... 711/202
5,627,783   5/1997  Miyauchi ............................ 365/185.33

Primary Examiner—Tod R. Swann
Assistant Examiner—J. Peikari
Attorney, Agent, or Firm—Blakely, Sokoloff, Taylor & Zafman

[57] ABSTRACT

A nonvolatile memory having a plurality of individually erasable blocks is used to store sectors of a file. A method of overwriting the file includes the step of receiving a frame of data. The logical sector that the frame is to be written to is determined. The logical sector corresponds to a first sector located at a first offset in a first block of the nonvolatile memory. The first block also has an associated first logical block number. The frame of data is written to a second sector. The second sector is located at a second offset in a spare block. The first and second offsets are identical. The logical block number of the spare block is updated to be the same as the first logical block number.

17 Claims, 8 Drawing Sheets

METHOD FOR PERFORMING A CONTINUOUS OVER-WRITE OF A FILE IN NONVOLATILE MEMORY

FIELD OF THE INVENTION

This invention relates to the field of file storage in computer systems. In particular, this invention is drawn to methods for overwriting a file stored in a solid state disk using a sector-based file management system.

BACKGROUND OF THE INVENTION

Computer systems typically have some form of nonvolatile mass storage device. The computer's operating system is responsible for communicating with the mass storage device in order to create, delete, modify, or append files stored within the mass storage device. Data is stored on the disk by writing to a file within the mass storage device.

An electromechanical hard drive is one type of nonvolatile mass storage device often used by computer systems. Electromechanical hard drives have one or more circular platters or disks. These circular platters include a magnetic storage media for storing data. The platters are divided into concentric circles called tracks. The platters are also divided radially such that the tracks are subdivided into sectors. Thus a platter has a plurality of tracks, wherein each track has a plurality of sectors.

Each sector has a predetermined sector number for reference by the computer system. A file stored in an electromechanical hard drive might occupy a number of sectors. The sectors (i.e., file sectors) associated with the file can be located on one or more platters such that the associated sectors are not necessarily consecutively numbered nor are the sectors necessarily contiguously located to each other. Once a file is created, new data can be stored by appending the new data to the file. This typically results in the expansion of the size of the file by allocating additional sectors to the file.

Some applications only need to modify a pre-existing file rather than appending to the pre-existing file. For example, consider an application which only requires storage of a "window" of data. At any one time only a fixed amount of data must be stored. Instead of continuously appending new data to the file and thus expanding the storage requirements for the file, portions of the file are overwritten with the current window of data. Thus, for example, once sufficient file space is allocated on an electromechanical hard drive to account for the window of data, the file or portions of the file may be continuously overwritten with incoming data so that the file or some portion of the file represents the current window of data. The new version of a sector of data is used to overwrite an older version of the data stored in the same sector. This technique is particularly useful if the electromechanical hard drive is substantially full of data.

Solid state disks provide a mass storage alternative to the electromechanical hard drives. Solid state disks generally use nonvolatile semiconductor memories to provide mass storage. In order to maintain compatibility with electromechanical hard drives, however, solid state disks typically support the same sector-based file storage scheme so that a computer system can refer to numbered sectors in order to store or retrieve data from the solid state disk.

In contrast with an electromechanical hard drive, the nonvolatile memory of a solid state disk typically must be erased before they can be reprogrammed. Thus in order to change the data stored in a portion of the memory, that portion of the memory must be erased first. For some nonvolatile memories, however, erasure can take a relatively long period of time.

In order to achieve solid state disk performance on par with that of an electromechanical hard drive, one technique for updating a file sector writes a new version of the sector to another location within the nonvolatile memory. One disadvantage of writing sectors to different locations within the nonvolatile memory is that a sector map may be required to track the location of the current version of the sector. The sector map will need to be updated every time a sector is relocated.

The old versions are eventually erased in a background cleanup process in order to free up storage space. The background cleanup process permits deferring erasure until some point at which the erasure will not adversely affect the effective programming or write time for the nonvolatile memory.

The deferred erasure process may be suitable for some applications such as intermittent data transfers to the solid state disk, however, the deferred erasure process described above may be unsuitable for a file that is being continuously overwritten. In particular, if the background cleanup process is deferred long enough, a foreground cleanup process will have to be executed in order to free up additional space in the nonvolatile memory.

While the foreground cleanup process is executing, the incoming data must be temporarily stored elsewhere or ignored. Ignoring the data results in loss of the data, which should be avoided. Providing for a relatively large amount of temporary storage tends to increase the cost and size of the solid state drive. Furthermore, insufficient temporary storage can result in loss of data once the temporary storage is exceeded.

A method for permitting continuous overwrite of a file stored in a nonvolatile memory is needed.

SUMMARY OF THE INVENTION

In view of limitations of known systems and methods, a method for overwriting a file stored in a nonvolatile memory is provided. The method includes the step of receiving a frame of data. A logical sector that the frame is to be written to is determined. The logical sector corresponds to a first sector located at a first offset in a first block. The first block has an associated first logical block number. The first sector presently stores a portion of the file. The frame is written to a second sector which is located at a second offset within a spare block. The second offset is chosen so that the first and second offsets are identical. The logical block number of the spare block is updated to be that of the first block.

Another method of overwriting the file includes the use of an overhead region to avoid the loss of incoming data during block reclamation. After receiving a plurality of frames of data at least one of the frames is stored in an overhead region of the nonvolatile memory. A logical sector that the frame is to be written to is determined. The logical sector corresponds to a first sector located at a first offset in a first block of the nonvolatile memory. The first block has a first logical block number. A portion of the file to be overwritten is presently stored in the first sector. The first frame is then copied from the overhead region to a second sector. The second sector is located at a second offset in a spare block of the nonvolatile memory. The second offset is chosen so that the first and second offsets are identical. The process is repeated for each frame subsequently stored in the overhead region, if the logical sector that the subsequent frame is to be written to corresponds to any sector physically located in the first block. The logical block number of the spare block is updated to be that of the first block.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Operating systems that support electromechanical hard drives typically use a sector-based scheme for managing files. The user or individual application programs do not typically deal directly with sector numbers when writing to or reading from the electromechanical hard drive. Typically, the operating system supports the use of a file pointer to locate or identify a specific sector of the file. Thus the operating system is responsible for communicating sector numbers to the electromechanical hard drive to store or retrieve sectors of data associated with the file.

Generally operating systems use some type of allocation map to locate all the sectors associated with a given file. One type of sector-based filing system uses a file allocation table (FAT) in order to keep track of the sectors associated with a particular file. The FAT is a table of allocation units typically stored in a predetermined place in an electromechanical hard drive. The allocation unit is the smallest amount of size allocable to a file. An allocation unit can be as small as a sector. Because the FAT is stored in a predetermined place in the electromechanical hard drive, the FAT only permits a fixed maximum number of entries. In order to accommodate larger disks which have more sectors, however, the number of sectors per allocable unit increases so that one allocable unit consists of a cluster of sectors. The FAT essentially serves as an index to indicate which sectors are associated with a given file.

The use of a FAT permits files to use sectors which are not physically grouped together. As files are created, the operating system searches for available space on the disk in order to store the file. If sufficient contiguous storage is available, the operating system stores the file onto the hard disk such that the file uses consecutively accessed sectors for storage. Otherwise, the operating system will place portions of the file wherever space is available until the file is completely stored to disk. The FAT helps to map the location of the file on the disk. In order to retrieve the file from the disk, the FAT is used to locate sectors associated with the file. The sectors are then "chained" together to retrieve the file or portions of the file from the disk.

As files are created, modified, and deleted individual files tend to become "fragmented" such that they are no longer stored contiguously on the disk. The operating system will fragment a file if necessary in order to store it in space scattered throughout the hard drive. The use of allocation maps and sector numbers enables retrieving, storing, and modification of files stored on an electromechanical hard drive.

One type of mass storage media alternative to an electromechanical hard drive is a solid state disk. The solid state disk comprises some form of nonvolatile memory. One type of nonvolatile memory used in solid state disks is floating gate electrically erasable programmable read only memory ("flash EEPROM" or "flash memory").

A flash memory cell is erased by reducing the net charge on the floating gate below a predetermined threshold. An erased cell is said to store a binary "1" by convention. A flash memory cell is programmed when the net charge exceeds a predetermined threshold. A programmed cell is said to store a binary "0" by convention. A flash memory cell cannot be reprogrammed without a prior erasure with one exception. A flash memory cell can be programmed to a "0" at any time by adding charge to the floating gate.

Flash memories are typically divided into individually erasable blocks. Each block includes a number of flash memory cells. Although each block can be individually erased, a given flash cell can only be erased by erasing its entire block. Thus to reprogram a flash cell, an entire block of cells must first be erased.

For an electromechanical hard drive, the operating system might request the drive controller to provide the data from a sector identified by a particular sector number. Because the nonvolatile memory is not an electromechanical hard drive, a translation mechanism is needed to translate the sector numbers into physical addresses for the nonvolatile memory. In one embodiment this translation is accomplished in software and is referred to as the Flash Translation Layer (FTL). FTL permits a solid state disk to emulate an electromechanical hard drive so that operating systems which support electromechanical hard drives can continue to use sector-based file systems for solid state disks comprising nonvolatile memory such as flash memory.

In addition to allocating space for a file when created, the operating system must handle modifications to a pre-existing file. As stated above, operating systems that support electromechanical hard drives typically use a sector-based scheme for managing files. In particular, the operating system supports using a file pointer to locate or identify a specific sector associated with data to be modified. The sector can then be overwritten with the updated data.

Because of the relatively long erase time required by flash memory, a logical sector addressing scheme is used rather than a physical sector addressing scheme. In other words, instead of having a fixed correspondence between sector numbers and physical addresses of the nonvolatile memory, new data for a sector is written to a new physical location if an older version of the sector data already exists. The older version is then marked invalid so that it may be recovered subsequently during a reclamation process. Thus the sector numbers are "logical" rather than physical because the same sector number might access different physical addresses over time. A sector map is required in order to track the current physical location associated with a logical sector number. In one embodiment, the FTL handles management of the sector map. A block may contain a mix of sectors containing valid data and sectors containing invalid data.

Thus the solid state disk appears to be a continuous sectored medium to the host computer system. FTL, however, relocates sectors transparently to the operating system so that a sector number is no longer permanently associated with a specific range of physical addresses. FTL tracks the logical-to-physical relationship using the sector map.

In one method of writing to a solid state disk, new data is written into existing free space within the solid state disk. Old versions of the data are deleted in place. Once the solid state disk exceeds a predetermined threshold of deleted data, a reclaim operation must be performed in the foreground in order to free up the storage areas associated with the deleted data. A spare block is used during the reclamation procedure for storing valid sectors of data from a block that is scheduled for a clean-up operation. The scheduled block has exceeded a threshold level of deleted data. The valid sectors within the scheduled block are copied from the scheduled block to the spare block so that the scheduled block can be erased to free up additional memory.

The above technique can only be used whenever the solid state disk can increase the available space by reclaiming space used by deleted data. Once the solid state disk is full and contains no deleted data, the technique presented above cannot be used to write new data to the disk even if a file is being modified rather than appended to.

Some applications are suited for updating a pre-existing file by modifying the file rather than appending to it. Consider for example an application where only a "window" of data needs to be maintained. Old data can be replaced with new data so that the length of the file does not need to be expanded as long as the file is sufficiently large enough to accommodate the desired window of data. In such a case, the length of the stored file does not need to increase. The file or portions of the file are overwritten as needed. For example, consider an application which receives and stores frames of data in a buffer. The data is retrieved from the buffer and used to overwrite portions of the stored file.

Figure 1:
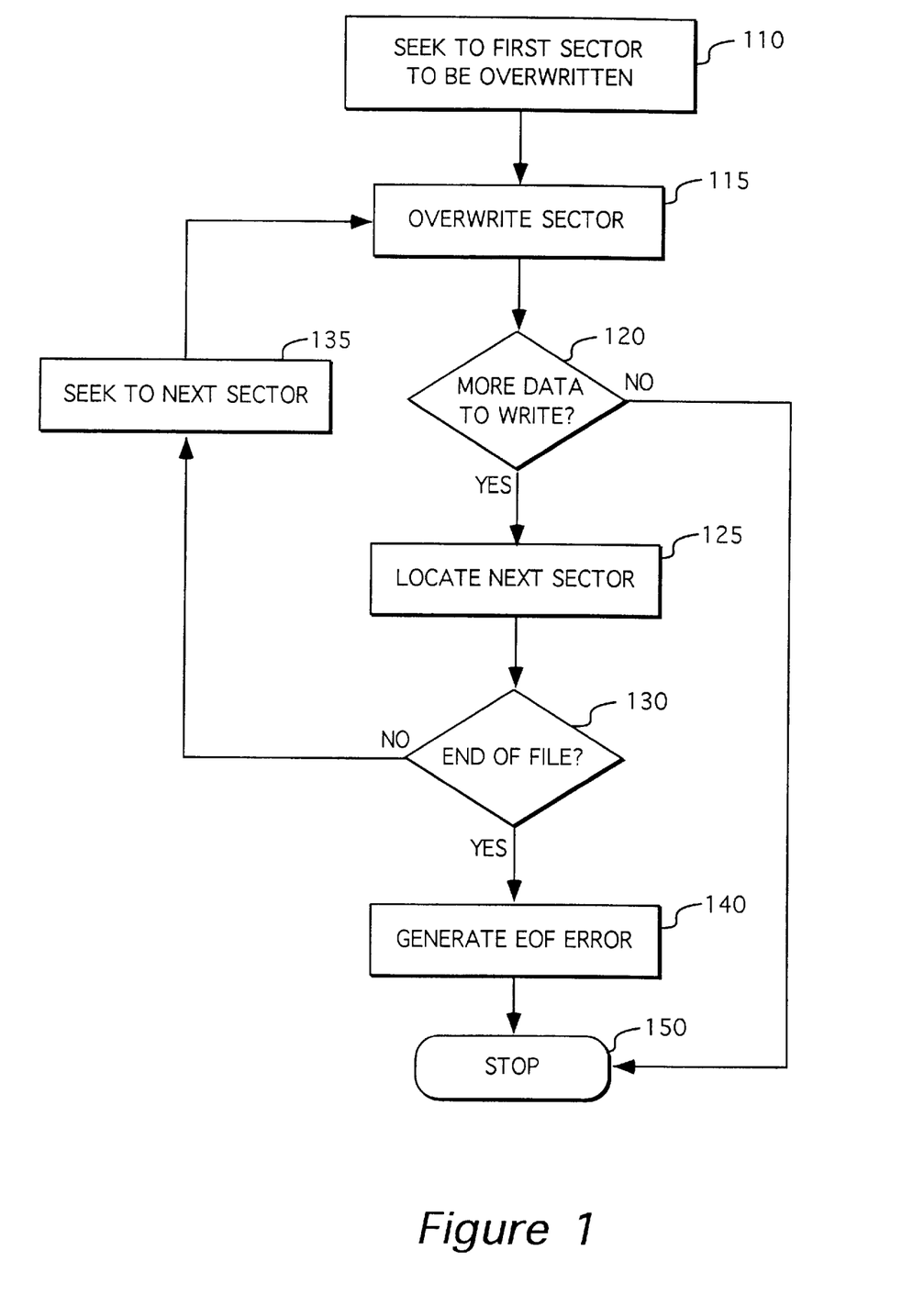
FIG. 1 illustrates a method for performing an overwrite of a file stored in an electromechanical hard drive.

FIG. 1 illustrates a flowchart for a method for overwriting a file stored in an electromechanical hard drive. In this embodiment the overwrite may begin at any selected sector within the file and continues until the end of the file is reached.

In step 110, a seek is performed to position a file pointer to the first sector that is to be overwritten. The sector is then overwritten in step 115. Step 120 determines if there is more data to write. If not, then the process ends in step 150. Otherwise the process continues with step 125.

In step 125, the next sector to be overwritten is located. In this embodiment, the overwrite process terminates if the end of the file is reached. Therefore, step 130 determines if the file pointer has reached the end of the file (i.e., there is no "next sector"). If the end of the file is reached, then an end of file (EOF) error is generated in step 140 and the process ends in step 150.

If the file pointer is not at the end of the file, then a seek is performed to position the file pointer to the next sector to be overwritten in step 135. The process then continues by overwriting the sector in step 115.

Figure 2:
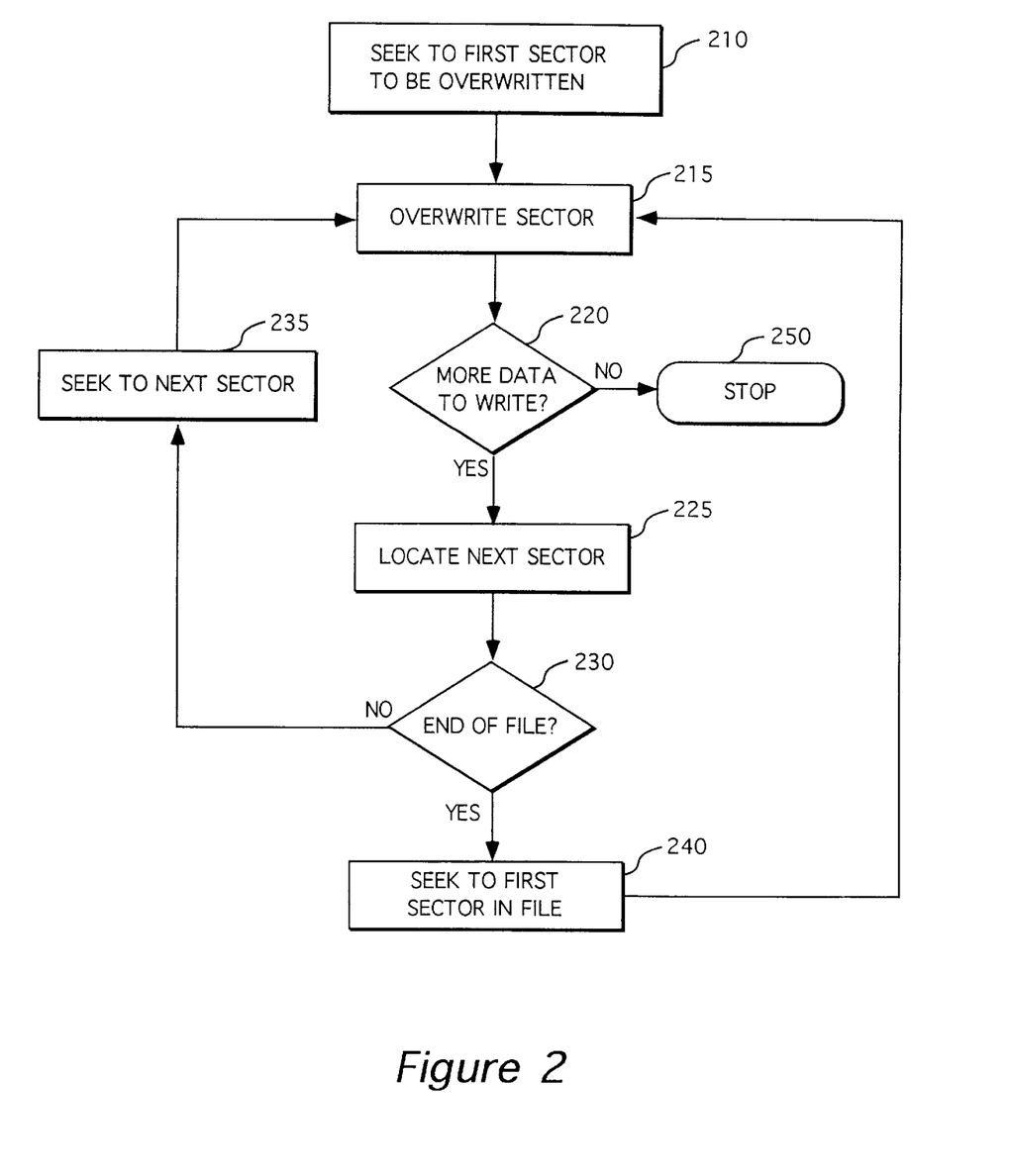
FIG. 2 illustrates an alternative method for performing an overwrite of a file stored in an electromechanical hard drive.

FIG. 2 illustrates a flowchart for another method for overwriting a file stored in an electromechanical hard drive. In this embodiment the overwrite may begin at any selected position within the file and continues until the end of the file is reached. Instead of generating an error message and stopping when the end of the file is reached, however, the overwrite continues with the first sector in the file as described below.

In step 210, a seek is performed to position a file pointer to select the first sector that is to be overwritten. The selected sector is then overwritten in step 215. In step 220 a test is performed to determine if there is more data to be written to the file. If not, then the process ends in step 250. Otherwise the process continues with step 225.

In step 225, the next sector to be overwritten is located. Step 230 determines if the file pointer has reached the end of the file. Unlike the embodiment in FIG. 1, however, this overwrite process does not terminate once the end of the file is reached. If an end of file is detected in step 230, the file pointer is repositioned by performing a seek to locate the first sector in the file. The overwrite process then continues from the beginning of the file by proceeding to step 215.

From step 230, if the end of the file has not been reached then step 235 performs a seek to reposition the file pointer to the next sector. The next sector is then overwritten in step 215.

As stated above, however, some solid state disks use nonvolatile memories which cannot be reprogrammed without erasing them first. This means that a sector cannot simply be located and overwritten as illustrated in FIGS. 1 and 2.

In order to perform a continuous overwrite for a sector based file in a nonvolatile memory, the positioning and overwriting steps from FIG. 1 are modified. In particular, the newer version of the data is stored in a manner which helps to minimize the amount of "rework" otherwise required during block reclamation. To the extent possible, the reclamation process is performed "in place." This helps to eliminate the bottleneck of a forced foreground cleanup. In addition, this helps to minimize the amount of overhead required to accommodate incoming data when blocks must be reclaimed in order to free up more space.

Figure 3:
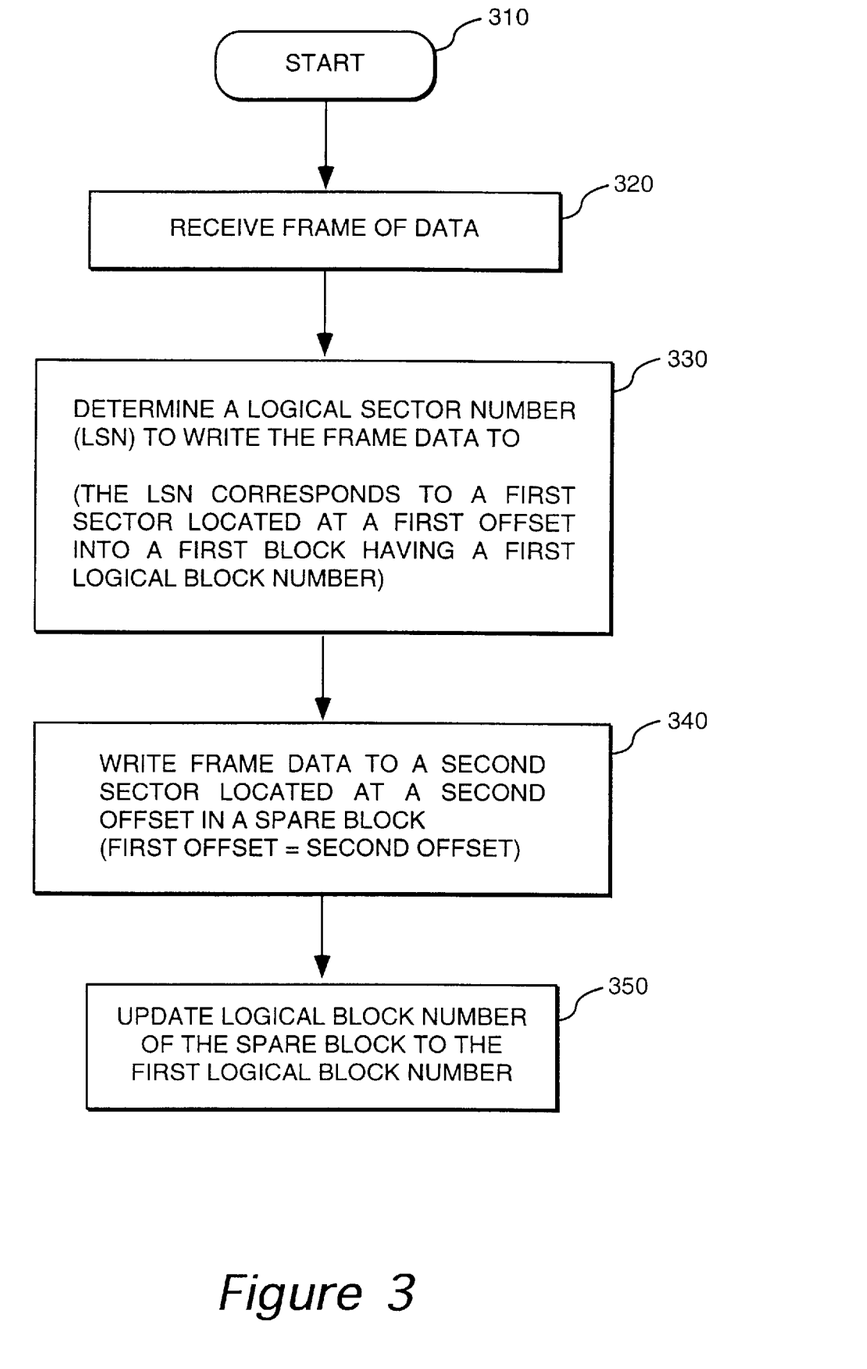
FIG. 3 illustrates a method used when overwriting a file stored in a nonvolatile memory.

FIG. 3 illustrates the core steps for performing an overwrite of a file in a solid state disk. These steps can be applied to applications in which the overwrite process terminates at the end of the file as well as applications in which the overwrite process returns to the beginning of a file being overwritten once the end of file is reached as illustrated in FIGS. 1 and 2, respectively.

The procedure begins in step 310. In step 320 a frame of data is received. In step 330, the sector that the frame data is to be written into is determined. The frame data represents the current version of the data that should be in the physical sector. Instead of using physical sector numbers which always correspond to a specific physical address, this method uses logical sector numbers. The logical sector number that the frame data is to be written to corresponds to a first physical sector located at a first offset into a first block. The first block also has an associated first logical block number. Thus in step 330, the logical sector number that the frame data is to be written to is determined.

As stated above, the nonvolatile memory sector cannot be programmed without first erasing it. Therefore, the frame data is written to a spare block associated with the first block. Thus in step 340, the frame data is written to a second sector which is located at a second offset in a spare block. The second offset is selected so that it is identical to the first offset. Thus the frame data is written into the spare block so that the data being replaced and the frame data are located at the exact same positions within the first and spare blocks, respectively.

The example presented in FIG. 3 assumes that only one sector is updated. After the frame data is written, the logical block number of the spare block is updated to be the same as the first logical block number in step 350. The first block is marked invalid to avoid errors from having two blocks with the same logical block number. This might be accomplished, for example, by programming a value to a block status area of the spare block. The spare block now has the identity of the first block. Because the logical sector corresponds to a physical sector located in the spare block at the same position that an older version of the physical sector was located in the first block, no update of the sector maps is necessary.

Figure 4:
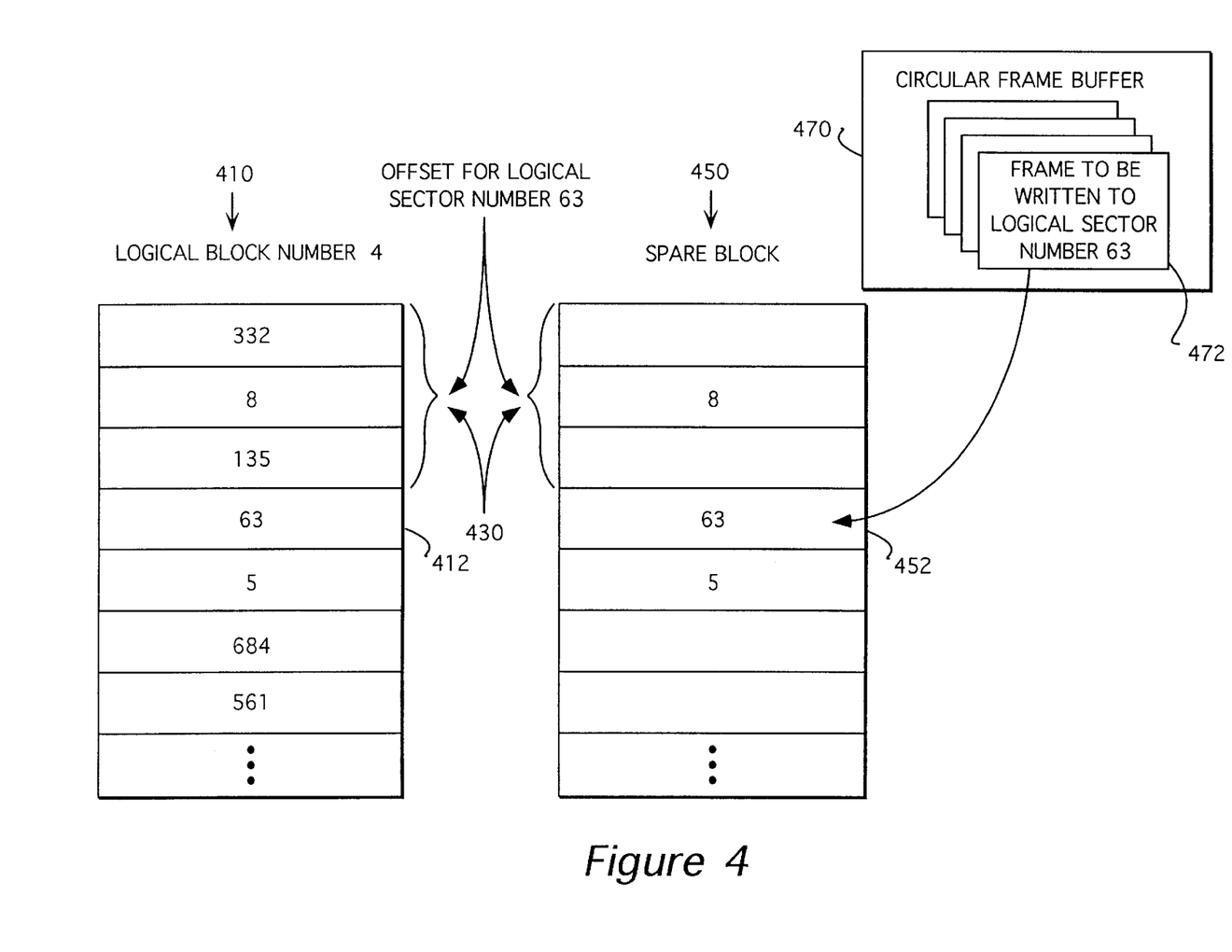
FIG. 4 illustrates the application of the method of FIG. 3.

FIG. 4 is provided to illustrate the application of the method illustrated in FIG. 3. In particular, block 410 (i.e., logical block number 4) holds the current version of logical sector number 63. Spare block 450 is the spare block associated with block 410. Circular frame buffer 470 includes a series of frames of data which need to be stored in the solid state disk.

In accordance with step 330 of FIG. 3, the logical sector number that the frame data is to be written to is determined. Typically the disk operating system provides the sector numbers that the data is to be written to. For example, frame 472 is to be written to logical sector number 63. The physical sector corresponding to logical sector number 63 cannot be reprogrammed until it is erased.

The physical sector currently associated with logical sector number 63 is physical sector 412 in block 410. Physical sector 412 is located at an offset 430 within block 410. In accordance with the method set forth in FIG. 3, frame 472 is written into physical sector 452 of spare block 450. Physical sector 452 is located at the same offset 430 within spare block 450 as physical sector 412 is located within block 410. Logical sector 63 now corresponds to physical sector 452.

The use of logical block numbers and the fact that the logical sectors are relocated to the same offsets within the spare block eliminates the need to update sector maps every time an erase is deferred.

Although the newer version of data for logical block number 4 is being stored in spare block 450, the sectors containing older versions of the data cannot be reused without erasing block 420. In this example, sectors 8, 5, and 63 in block 410 have been updated with data. Sectors 332, 135, 5, 684, and 561, however, may represent valid sectors which have not been replaced by updated data in the spare block. A reclamation process is used to reclaim the valid sectors out of block 410 so that the space no longer needed by sectors 8, 5, and 63, can be freed up to store additional incoming data. This process is referred to as a cleanup process. After sectors 8, 5, and 63 have been updated, block 410 is scheduled for cleanup.

In one embodiment of a solid state disk, each block of memory includes one or more sectors of data. Over time, a block may eventually reach a threshold level of sectors containing an older version of data. In order to reclaim the space holding the older version of the data, the entire block must be erased. If the block is storing more than one sector of data, then any other valid sectors in the block must be copied to another block before the erasure.

This is accomplished by copying the valid sectors of data from the block scheduled to be erased (source block) and writing the copied information to another block (target block or spare block). The copied data uses the same logical sector number even though it is stored in another block. The source block or the sectors within the source block are marked as invalid to prevent operations that might interrupt the erasure process from writing to the older versions of the sectors. The source block is then erased.

Because there is not a permanently assigned portion of physical memory for a given sector number, the cleanup process may be deferred and prioritized so that it is performed only when solid state disk performance would not be adversely impacted with respect to pending read and write commands received from the computer system. In this case, the cleanup process is executed as a background process.

Typically write operations will have a higher priority than erase operations so that erases are deferred in order to achieve a faster response for write operations. Thus even if a cleanup process is currently executing, a pending write operation will cause the cleanup process to be interrupted so that the pending write operation will be performed. After the write operation is performed, the cleanup process can continue in the background.

If, however, the disk has insufficient available space, a foreground cleanup process will have to be executed before additional data can be written to the disk. Thus writes cannot be prioritized over erasures because there is no available memory for the write operation.

If a foreground cleanup process is executing, incoming data must be temporarily stored in another location. The amount of temporary data space required is related to a number of factors including the time required to perform the foreground cleanup process and the rate of incoming data. The temporary data is stored in an overhead region of memory.

In order to recover the space used by the sectors containing the invalid data, the valid sectors are copied from a block scheduled for cleanup (a source block) to a spare block. Then the source block can be erased for a net recovery of the space consumed by the sectors containing invalid data in the source block.

Figure 5:
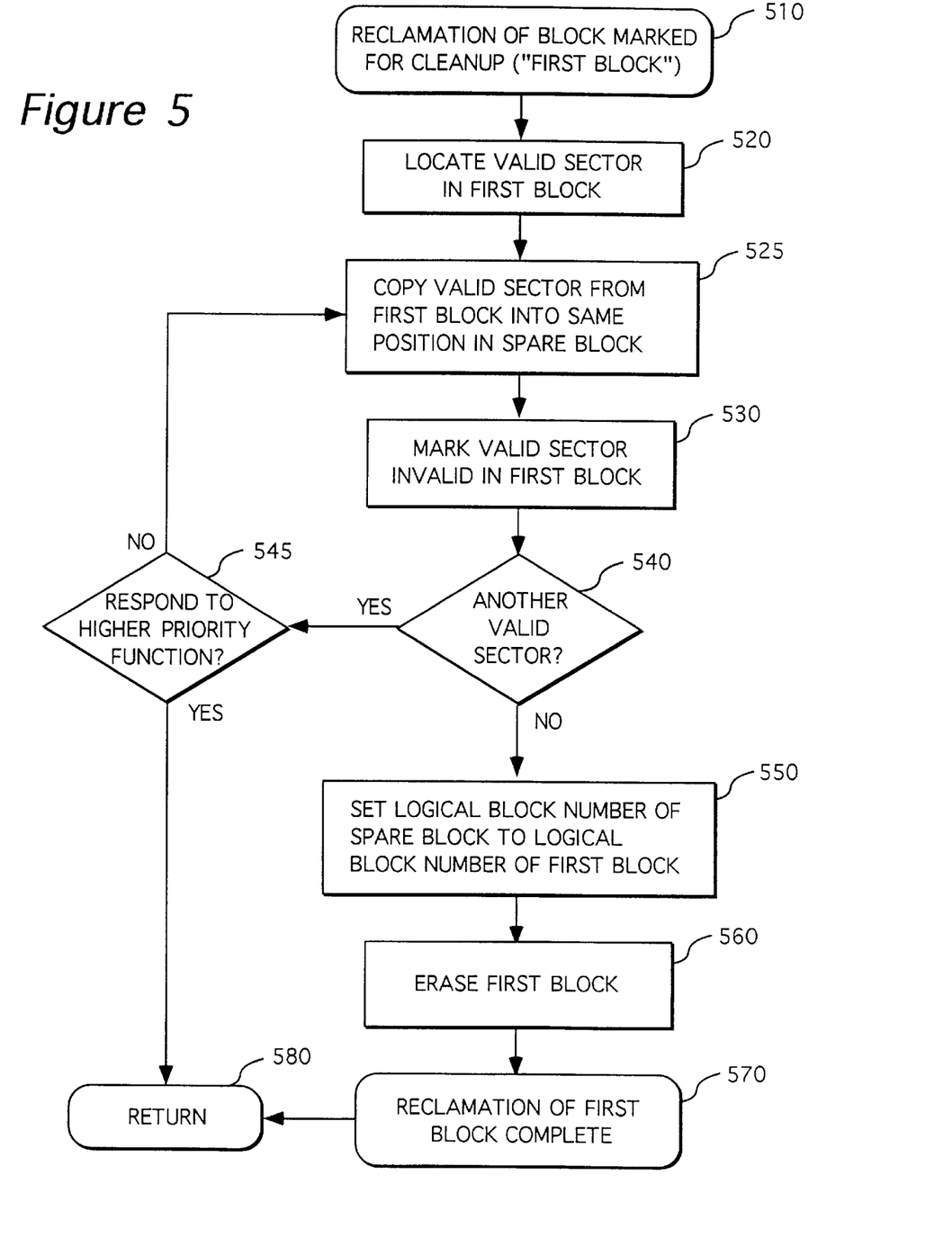
FIG. 5 illustrates a method of reclaiming a block marked for cleanup.

FIG. 5 illustrates the steps for cleaning up a block (e.g., a "first block") using an associated spare block beginning with step 510. The first block has a first logical block number.

In step 520, the location of a valid sector in the first block is determined. In step 525, the valid sector is copied from the first block into the spare block. The valid sector is copied so that it is located at the same position (i.e. at the same offset) within the spare block as it was located within the first block.

In step 530, the copy of the valid sector in the first block is marked as invalid. In one embodiment, this is accomplished by modifying status bits in a header or a footer area of the sector. In an alternative embodiment, a block status area for the spare block or the first block is modified to indicate that the spare block represents the most recent version of the logical sectors stored within.

In step 540, a test determines if another valid sector exists in the first block. Steps 525, 530, and 540 will be executed until no more valid sectors remain in the first block.

If another valid sector is located within the first block in step 540, then step 545 determines if a higher priority function should be responded to. Step 545 effectively serves as an interrupt window so that the background reclamation process can be interrupted to handle higher priority functions such as storing new frames of incoming data.

If a higher priority function must be responded to then the process proceeds to step 580 so that the background process is deferred. Otherwise, step 545 proceeds to step 525 to continue the process of reclaiming the block marked for cleanup.

From step 540, if no more valid sectors remain in the first block, then the spare block is assigned the logical block number of the first block in step 550. Next, the first block is erased in step 560. The reclamation of the first block is then complete in step 570. The reclamation process exits in step 580. The former first block is now available for use as a spare block during the reclamation of some other block.

Figure 6:
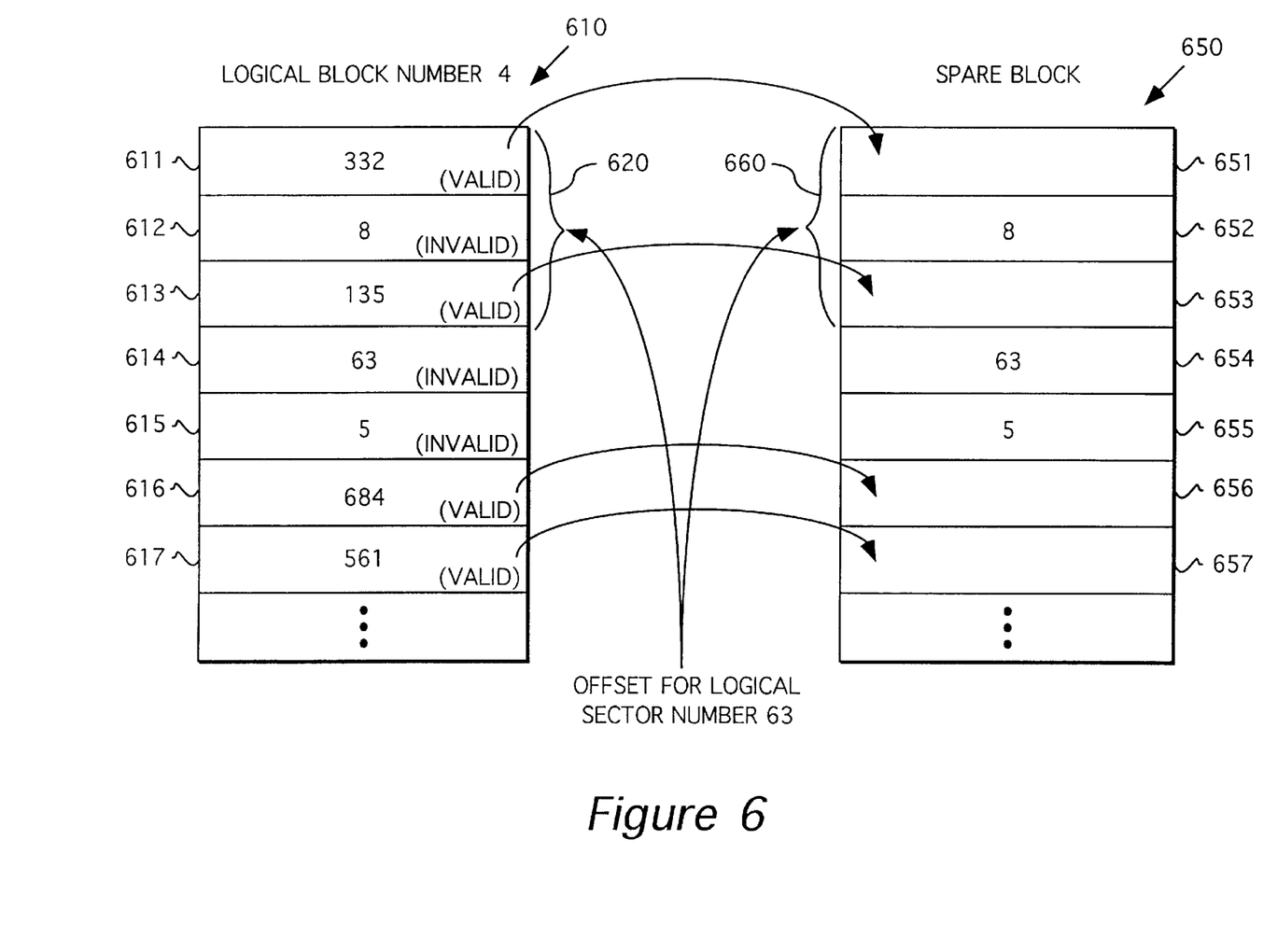
FIG. 6 illustrates the application of the method of FIG. 5.

FIG. 6 illustrates the application of the method of FIG. 5 using block 610 as the first block and block 650 as the spare block. Logical sectors 8, 5, and 63 have already been updated through the overwrite process and are currently associated with physical sectors 652, 655, and 654, respectively, in spare block 650. Thus logical sector numbers 8, 5, and 63 within the first block 610 are no longer considered to be valid or current. The remaining valid sectors of block 610, however, must be copied into spare block 650. Thus logical sectors 332, 135, 684, and 561, for example, are copied into spare block 650.

When copied, logical sectors 332, 135, 684, and 561 are copied into the spare block at the same offset that they were located within the first block. For example, invalid logical sector 63 is located at an offset 620 within block 610. The valid logical sector 63 is located at an offset 660 within spare block 650. Offsets 620 and 660 are the same so that the relative offset of the physical sector associated with logical sector 63 remains constant. Logical sectors 332, 135, 684, and 561 are copied in a manner which ensures they are located at the same offset within spare block 650 as previously located within block 610.

Logical sectors 332, 135, 684, and 561 correspond to physical sectors 611, 613, 616, and 617, respectively, of block 610. Logical sectors 332, 135, 684, and 561 are therefore copied to physical sectors, 651, 653, 656, and 657, respectively, in the spare block. This ensures that no sector maps need to be updated after the reclamation is completed.

The reclamation process uses at least two blocks for every block being reclaimed. The first block used is the block being cleaned up or reclaimed and the second block is the spare block associated with the block being cleaned up. The incoming data frames, however, may not all be associated with logical sectors located within the same block. In such a case, a "block jump" must be performed to begin storing the incoming data frames in another block.

Every time a block jump is required, there might be at least two fewer blocks immediately available for storing the incoming data. If there are no more available spare blocks, then the frame data must be written into an overhead region in order to avoid the loss of incoming data while the reclamation of the previous block is being completed.

Figure 7:
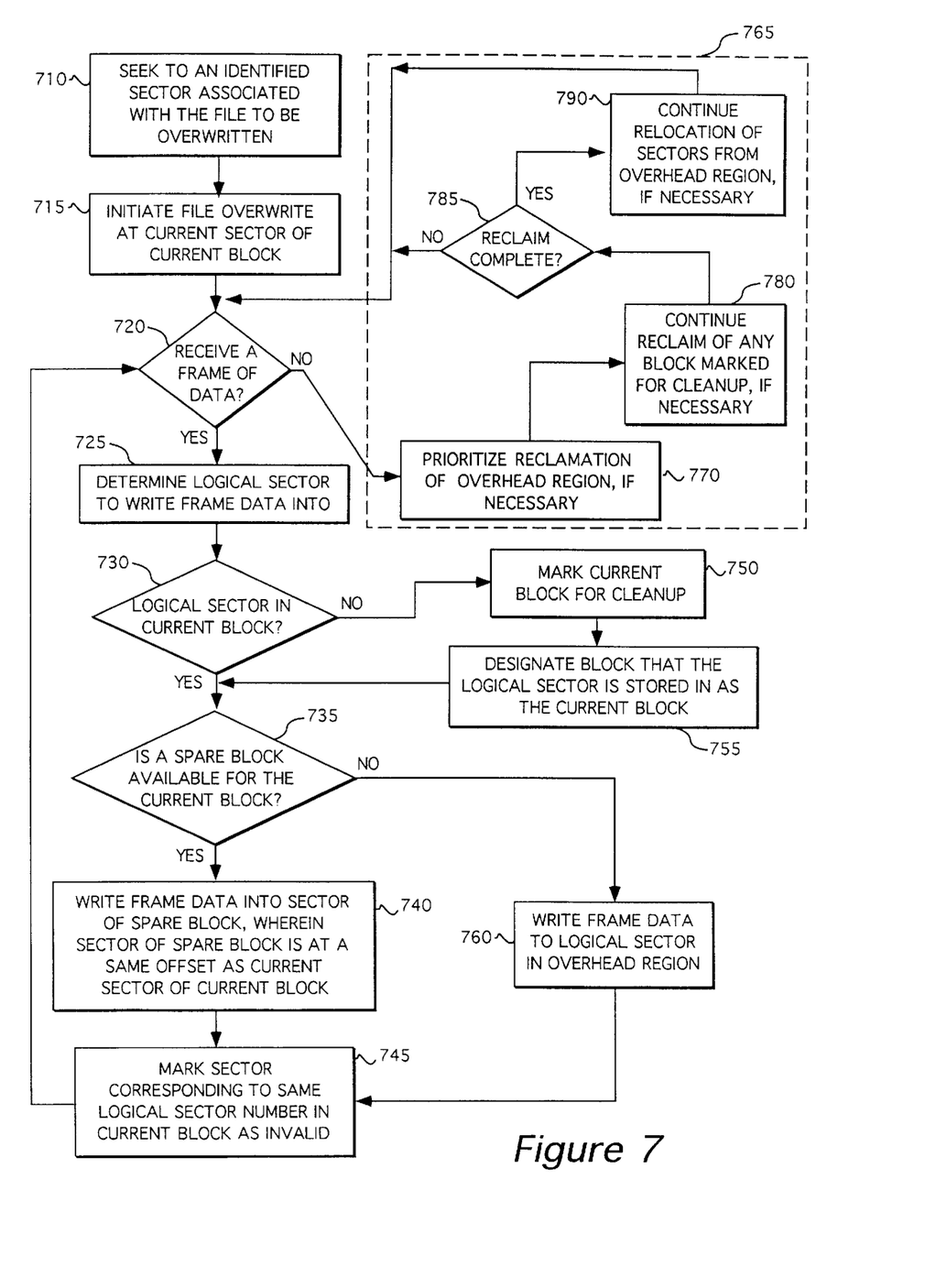
FIG. 7 illustrates a method for performing a continuous overwrite of a file stored in a nonvolatile memory.

FIG. 7 illustrates the integrated process of initiating and performing a continuous overwrite of a file stored as a sector based file structure in a nonvolatile memory including the use of an overhead region. This process is particularly suited for overwriting files stored in nonvolatile memories which are full or substantially full.

The process begins in step 710 by performing a seek to an identified sector associated with the file to be overwritten. The identified sector and the block that the identified sector is located in become the "current sector" and the "current block," respectively. The file overwrite is thus initiated at the current sector of the current block in step 715.

In step 720, a test is performed to determine if a received data frame must be attended to immediately. If not, then the processing continues with the background processes 765 in order to prioritize reclamation of the overhead region, reclaim blocks marked for cleanup, or to relocate sectors from an overhead region as described below.

If the frame data must be attended to, processing continues with step 725 in order to determine the logical sector that the frame data should be written to. Step 730 determines if a block jump will be required.

If the logical sector is in the current block then a block jump is not required. Therefore processing continues with step 735. In step 735 a spare block for the current block is located, if possible. If there is no spare block associated with the current block at this time then the frame data is written to a logical sector in the overhead region in step 760. Otherwise the frame data is written into a sector of the spare block in step 740. When the frame data is written into a sector of the spare block, it is written at the same offset within the spare block as the data it is replacing is located in the current block.

In one embodiment, the frame of data is smaller than the size of a sector. Once the overwrite is initiated at a particular start address or start location within the file, subsequent frames of data replace subsequent locations within the file. Thus subsequent frames of data are tacked onto each other until the current sector is filled with the frames of data before moving to the next sector of the file. In essence, each subsequent frame of data is written to a frame offset within the sector being replaced, until the sector in the spare block is full.

In one embodiment, the overwrite method can be initiated at any point within a sector. Therefore the overwrite method might not be initiated at a sector boundary. If the start address that the initial frame of data is to be written to does not correspond to a sector boundary, then the data preceding the start address up to the sector boundary of the initial sector being overwritten should be copied to the spare block. Thus for the initial sector being overwritten, data preceding the start address of the frame up until the sector boundary of the sector being overwritten is copied to a same corresponding location in the spare block, if the start address is not aligned with a sector boundary of the initial sector being overwritten.

Once the frame data is written into the spare block (step 740) or the overhead region (760), the old version of the sector is invalidated. In one embodiment, this is accomplished by modifying status bits in a header or a footer area of the sector. In an alternative embodiment, a block status area for the spare block or the first block is modified to indicate that the spare block represents the most recent version of the logical sectors stored within. Whatever approach is chosen needs to ensure that the most recent version of a sector can be readily distinguished from older versions having the same logical sector number. The older sector numbers are effectively invalidated. Thus in step 745 the "current" sector of the current block is invalidated because it no longer represents the most recent version of the sector. From step 745 the process returns to step 720 to handle additional incoming data.

In step 730, if the logical sector number determined from step 720 is not located in the current block, then a block jump is necessary. Proceeding to step 750, the current block is marked for cleanup. In step 755, the block that the logical sector is stored in (i.e., the block "jumped to") is designated as the current block. Processing then returns to step 735 to determine if a spare is available for the new "current block."

Although handling incoming frames of data is high priority in order to ensure no data is lost, the overhead data and block reclamation will have to be attended to at some point. The processes of prioritizing the overhead region for cleanup 770, reclamation of blocks marked for cleanup 780, and relocating sectors from the overhead region 790 are all background processes which may be interrupted to attend to the higher priority function of handling incoming data (i.e., step 720).

If there is no frame of data that must be attended to immediately, the background processes 765 begin with prioritizing the reclamation of the overhead region, if necessary at step 770.

In one embodiment, the block that the overhead region resides in is scheduled for cleanup once the overhead region reaches a predetermined threshold number of available remaining sectors. The predetermined threshold should be chosen high enough so that given the erase times of a particular implementation, there will still be sufficient overhead to accommodate incoming data without running out of overhead before the overhead region is cleaned up.

The overhead region must be readily available to ensure that no data is lost. Thus once the overhead region reaches a predetermined threshold number of used sectors, the block that the overhead region resides in is scheduled for cleanup. Regardless of whether any other blocks are scheduled for cleanup, the reclamation of the block that the overhead region resides in is given a higher priority in step 770. This causes the deferral of the reclamation of any other blocks, if necessary, to ensure ready availability of the overhead region.

In step 780, the process of reclaiming any block marked for cleanup is performed. Other than being prioritized over the reclamation of any other block, the block associated with the overhead region is reclaimed like any other block. If step 785 determines that the reclaim did not complete, then the background processes 765 are suspended in order to attend to higher priority functions. If the reclaim was not necessary or was successfully completed, processing continues with step 790.

The overhead region is only used to temporarily store sectors. Otherwise, the sector maps will need to be updated to reflect the new storage location of the sectors. To avoid the steps of updating the sector maps, the logical sectors in the overhead region need to be relocated into the proper physical sectors and blocks. Thus step 790 performs the relocation of sectors currently stored in the overhead region, if necessary.

Figure 8:
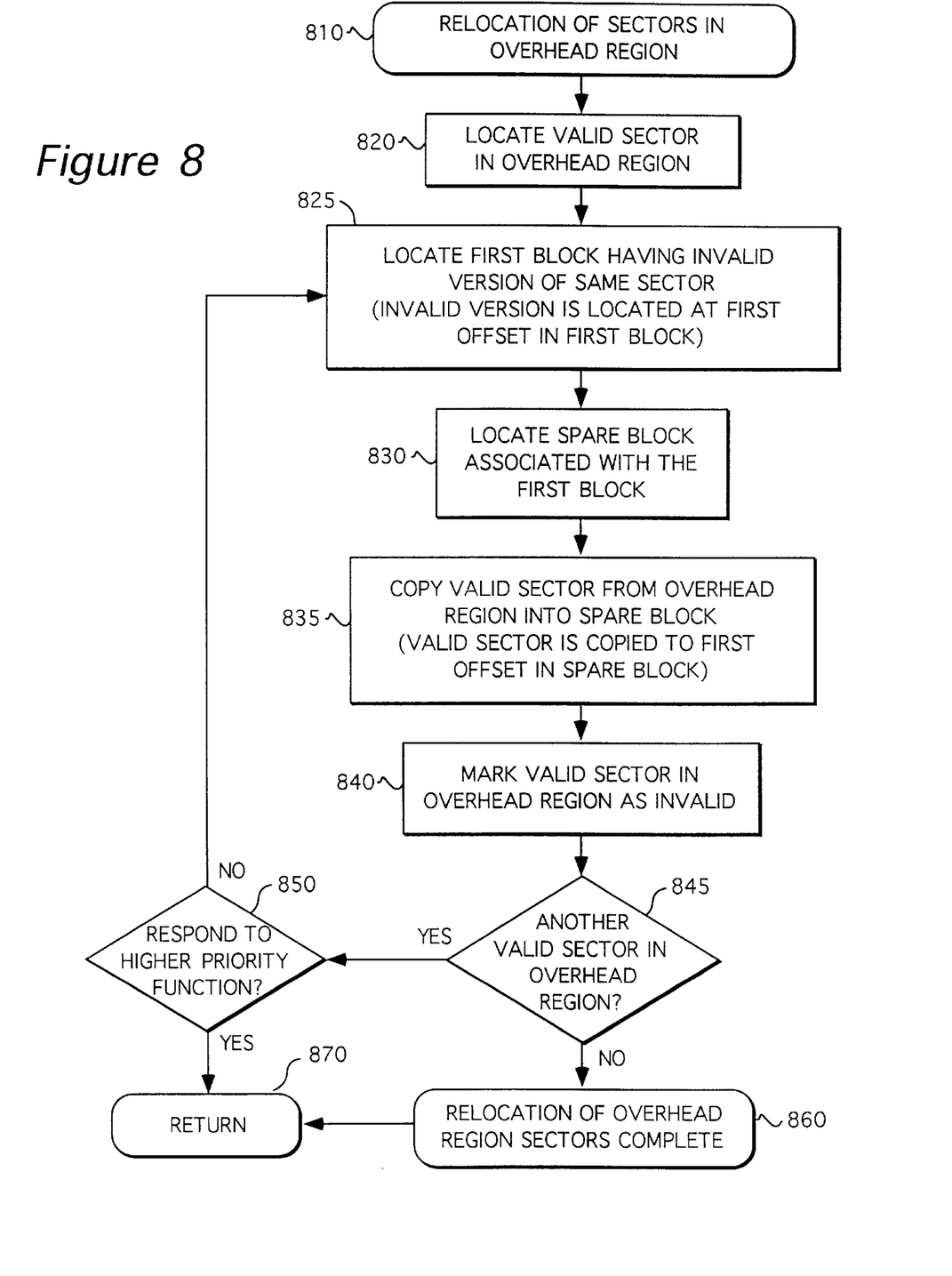
FIG. 8 illustrates a method for relocating sectors stored in an overhead region.

The process of relocating sectors currently stored in the overhead region is further illustrated in FIG. 8 beginning with step 810. In step 820, a valid sector is located within the overhead region. The block having an invalid version of the same sector is located in step 825. (The invalid version is located at a first offset within a first block).

A spare block associated with the first block is located in step 830. The valid sector from the overhead region is copied into the spare block in step 835. The valid sector is copied to an offset within the spare block that is the same as the offset of the invalid version of the sector within the first block. In step 840, the valid sector is marked invalid within the overhead region. In step 845, test is performed to determine whether any other valid sectors are present in the overhead region.

If another valid sector is located in the overhead region processing continues with step 850. Step 850 serves as an interrupt window to allow the background process to be halted in order to respond to a higher priority function such as handling incoming data frames. If a higher priority function needs to be attended to, the background process proceeds from step 850 to return in step 870. Otherwise, if a higher priority function does not interrupt the background process, the relocation continues by proceeding from step 850 to step 825.

If no other valid sectors are found in the overhead region in step 845, then the relocation of the logical sectors within the overhead region is completed as noted in step 860. The background process then terminates by proceeding to step 870.

Although contiguous storage of sectors associated with the same file is not necessary within the solid state disk, the methods described above require that a predetermined number of sectors associated with the file being overwritten must be located in the same block. The order or adjacency of these related sectors within the block is irrelevant. Whenever the next sector to be overwritten is not located in the current block, a block jump is required as discussed above with respect to FIG. 7.

As long as the frequency of block jumps is less than a certain threshold, the methods described above will be able to accommodate continuous overwriting of the file. The frequency of block jumps is determined by the level of fragmentation of the file. The threshold is determined in part by the incoming data rate and the speed of the reclamation process.

Data is continuously being received at an effective rate $r_i$ where $r_i$ is expressed in sectors/second. There must be sufficient overhead to accommodate the incoming data during a worst case reclamation time period. The worst case reclamation time period, $t_{reclaim}$, assumes that an entire source block of data must be copied into a spare block and that the source block must be erased in order to provide a new spare block for future reclaim operations. Thus time to copy an entire source block, $t_{copy}$, plus the time required to erase a block, $t_{erase}$, equal the worst case reclamation period such that $t_{reclaim}=t_{copy}+t_{erase}$. Therefore there must be sufficient overhead storage to accommodate at least $r_i \times t_{reclaim}$ sectors of data.

As an aside, $t_{reclaim}$ is not the unencumbered worst case foreground reclaim time. Given that the reclamation processes proceed in the background, $t_{reclaim}$ is affected by the amount of time allocated to process the background reclamation functions. Because the reclamation process is interrupted to attend to new frames of incoming data, $t_{reclaim}$ is also dependent in part upon the incoming data rate. Thus $t_{reclaim}$ reflects the worst case reclamation time when the solid state disk is substantially full of data and data is received at the rate $r_i$.

In one embodiment, the overhead region is large enough to accommodate at least $r_i \times t_{reclaim}$ sectors of data. If however, the overhead region just meets the minimum required overhead space, continuous reclamation will be required in order to free up the overhead region for additional incoming data. The continuous reclamation of the overhead region tends to detrimentally affect the throughput performance of the solid state disk. In addition, the continuous reclamation tends to consume greater amounts of power. Thus in order to improve solid state disk performance and to decrease power consumption, in one embodiment the overhead region is chosen to accommodate some multiple, m, of the minimum number of sectors (i.e., the overhead region accommodates $m \times r_i \times t_{reclaim}$ sectors where m>1). In one embodiment, m is chosen to be at least 4 so that the overhead region accommodates a minimum of $4 \times r_i \times t_{reclaim}$ sectors.

In order to achieve a continuous overwrite, the number of block jumps required when overwriting a file should be kept below a jump rate. This jump rate is inversely related to the number of consecutively chained file sectors located in the same block. Decreasing the jump rate can be accomplished by increasing the number of consecutively chained file sectors located in the same block. The file fragmentation level serves as a measure of the number of consecutively chained file sectors located in the same block. Thus a lower file fragmentation level helps to ensure a lower block jump rate. A certain threshold number of consecutively chained sectors must be located within the same block in order to ensure that there will always be a spare block for reclamation or an overhead region available for a given incoming data rate.

Therefore, in order to ensure that the file fragmentation level is low enough, the file may need to be defragmented before the continuous overwrite process can function properly. Only the fragmentation of the file being overwritten is pertinent. In one embodiment, each block except the last block used to store a portion of the overwritten file must have a minimum number, n, of consecutively chained sectors. In one embodiment, the overwrite terminates once the end of file is reached. Therefore, the block that stores the end of the file does not need to have the minimum number, n, of consecutively chained sectors.

In another embodiment, once the end of the file is reached, the overwrite process continues by proceeding to overwrite the first sector associated with the file. In this embodiment, there in essence is no "last block" for the overwrite process. Thus every block that a portion of the file is stored in should have the minimum number, n, of consecutively chained sectors.

In one embodiment, the threshold number, n, is greater than or equal to the maximum number of sectors of data that can be received in a worst case cleanup time period. In other words, $n \geq r_i \times t_{reclaim}$. The data rate, $r_i$ can be determined from $$r_i = \frac{\text{data rate (bytes/second)}}{\text{\#bytes/sector}}.$$

For example, a 1 Kb/second data rate is equivalent to a 2 sector/second data rate if 512 byte sectors are used.

Consider an example where the method of performing a continuous overwrite is used to store audio data. Audio data is received as frames of 84 bytes which are stored in a circular buffer. An audio frame is received every 40 ms. Thus the incoming data rate is $$\frac{84 \text{ bytes}}{.040 \text{ seconds}},$$

or approximately 2 kB/s. Assuming that the solid state disk is configured for 512 byte sectors, $$r_i \approx \frac{2000 \text{ bytes/second}}{512 \text{ bytes/sector}} \approx 4 \text{ sectors/seconds}.$$

For a worst case reclamation time of $t_{reclaim}$=5.66 seconds, approximately 23 sectors of data could be received during a worst case reclamation time period (i.e., $r_i \times t_{reclaim} \approx 4$ sectors/second×5.66 seconds≈23 sectors).

In this example, for $n \geq r_i \times t_{reclaim}$, a minimum of 23 consecutively chained sectors must be stored in each block that a portion of the file is stored in (except for possibly the last block as explained above). Thus if necessary the file should be defragmented to ensure that no less than 23 consecutively chained sectors are located in each block that a portion of the file is stored in.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of overwriting a file stored in a nonvolatile memory having a plurality of individually erasable blocks, each block allocated a plurality of sectors, comprising the steps of:

a. receiving a frame of data;

b. determining a logical sector that the frame is to be written to, wherein the logical sector corresponds to a first sector located at a first offset in a first block having a first logical block number, wherein a portion of the file is stored in the first sector;

c. writing the frame to a second sector, wherein the second sector is located at a second offset in a spare block, wherein the first and second offsets are identical.

2. The method of claim 1 further comprising the step of:

d. updating a logical block number of the spare block to the first logical block number.

3. The method of claim 1 wherein step a) further comprises the step of:

i. storing the frame of data in a circular buffer.

4. The method of claim 1 wherein step c) further comprises the step of:

i. copying data preceding a start address of the frame from the first sector of the first block to a same corresponding location in the spare block, if the first sector is the initial sector being overwritten and if the start address is not aligned with a sector boundary.

5. The method of claim 1 further comprising the steps of:

d. marking the first sector located in the first block as invalid; and e. reclaiming the first block.

6. The method of claim 5 wherein step e) further comprises the step of:

i. copying each valid sector stored in the first block into a same corresponding offset within the spare block; and ii. erasing the first block.

7. The method of claim 1, wherein step c) further comprises the step of:

i. determining a frame offset within the logical sector that the frame is to be written to; and ii. writing the frame to the frame offset within the second sector.

8. The method of claim 1 wherein the data is audio data.

9. The method of claim 1 wherein the nonvolatile memory comprises flash memory.

10. A method of overwriting a file stored in a nonvolatile memory, wherein the nonvolatile memory comprises a plurality of individually erasable blocks, wherein each block allocated a plurality of sectors of data, comprising the steps of:

a. receiving a plurality of frames of data including a first frame;

b. storing at least the first frame into an overhead region;

c. determining a logical sector that the first frame is to be written to, wherein the logical sector corresponds to a first sector located at a first offset in a first block having a first logical number, wherein a portion of the file is stored in the first sector;

d. copying the first frame from the overhead region to a portion of a second sector, wherein the second sector is at a second offset in a spare block, wherein the first and second offsets are identical; and e. repeating steps b) thru d) for each subsequent frame stored in the overhead region, if the logical sector that the subsequent frame is to be written to corresponds to any sector located in the first block.

11. The method of claim 10, further comprising the step of:

f. updating a logical block number of the spare block to the first logical block number.

12. The method of claim 10, further comprising the step of:

f. reclaiming the first block if the logical sector that the subsequent frame is to be written to does not correspond to any sector located in the first block.

13. The method of claim 12 wherein step f) further comprises the steps of:

i. copying each valid sector stored in the first block into a same corresponding offset within the spare block; and ii. erasing the first block.

14. The method of claim 10 further comprising the steps of:

f. performing the following steps if the logical sector that the subsequent frame is to be written to does not correspond to any sector located in the first block:

i. determining a portion of the logical sector that the subsequent frame is to be written to, wherein the logical sector corresponds to an invalid sector located at a third offset in a third block;

ii. copying the at least one frame of data from the overhead region into the spare block at the third offset.

15. The method of claim 10, wherein step c) further comprises the steps of:

i. determining a frame offset within the logical sector that the frame is to be written to; and ii. writing the frame to the frame offset within the second sector.

16. The method of claim 10 wherein the data is audio data.

17. The method of claim 10 wherein the nonvolatile memory comprises flash memory.

* * * * *